Sept. 4, 1962           R. GRZYMEK           3,052,069

AUTOMATIC FEED MECHANISM FOR MACHINE TOOLS

Filed July 10, 1961                                          5 Sheets-Sheet 1

INVENTOR.
ROLF GRZYMEK

BY

ATTORNEYS

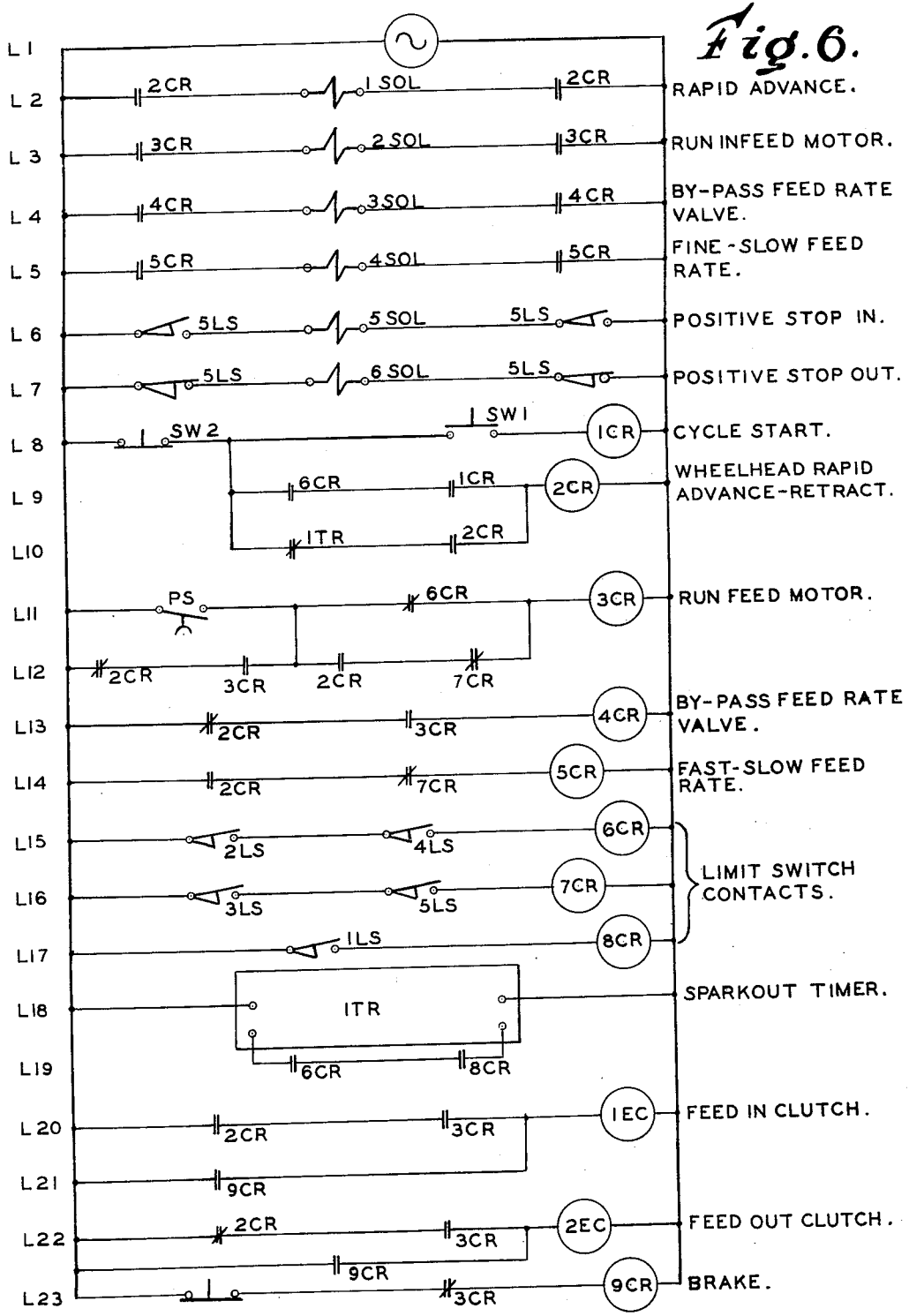

United States Patent Office 3,052,069
Patented Sept. 4, 1962

3,052,069
AUTOMATIC FEED MECHANISM FOR MACHINE TOOLS
Rolf Grzymek, Cincinnati, Ohio, assignor to The Cincinnati Milling Machine Co., Cincinnati, Ohio, a corporation of Ohio
Filed July 10, 1961, Ser. No. 122,712
9 Claims. (Cl. 51—165)

This invention relates to an automatic feed cycle control mechanism for a machine tool and is particularly adapted for use in a precision grinding machine.

A universal type of precision grinding machine is suited for performing finishing operations on a variety of workpieces. Often these workpieces are produced in lot sizes for which an automatic machine cycle is advantageous but for which special tooling is not warranted. The machine set up time for the job is an important factor in the cost of a finished unit and must be reduced as much as possible to keep production costs reasonable. An automatic feed cycle mechanism for a universal type machine must then conform to special standards. The mechanism must be usable in a variety of feed cycles and it must also be easily changed from one cycle to another in a short time.

It is therefore an object of this invention to furnish a machine feed cycle control mechanism that is adaptable to produce a variety of automatically reproduced cycles of machine slide movement.

A further object is to furnish such a mechanism which requires little time for making changes in an automatic cycle.

Yet another object is to provide a mechanism in which a change in an automatic grinder cycle may be accomplished conveniently by dial settings.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, this invention utilizes a set of cams and associated limit switches to control the cycle of movement of a machine slide. The cams are connected for rotation with a machine handwheel that is mechanically linked with the slide. When the handwheel is rotated, the slide is moved, the direction of movement corresponding to the direction of rotation of the handwheel. In automatic cycle, the handwheel is rotated by a feed motor which is connected to the handwheel through one of two clutches. One clutch connects the handwheel to the motor for rotation in one direction while the other clutch connects the handwheel for rotation in the other direction, thus producing a reversible motion of the slide. A positive stop is provided which is engaged by a dog fixed on the handwheel to stop rotation of the handwheel in a fixed position. One of the cams and its associated limit switch control the amount of normal automatic movement of the dog in one direction away from engagement with the positive stop to set a normal feed stroke length. Another of the cams and its associated limit switch are operable to change the rate of operation of the feed motor during rotation of the handwheel in the other direction toward the positive stop to provide a dual feed rate in corresponding slide movement. A third cam, which is rotated at a rate slower than the other two cams, is associated with two limit switches the condition of which renders the limit switches associated with the other two cams effective or ineffective during a period of rotation of the handwheel.

Thus, the third cam enables the first two cams to make a plurality of revolutions before the limit switches associated therewith are effective and an extended range feed movement may be provided by this relationship. The angular position of each of the cams is adjustable relative to the associated limit switch or switches independent of rotation by operation of the feed motor. This independent adjustability provides the convenient alterability of the automatic cycle while the normal and extended range capabilities provide a wide range of feed stroke lengths.

A clear understanding of the construction and operation of this invention will be obtained from the following detailed description in which reference is made to the attached drawings wherein:

FIG. 6 is an electrical control diagram.

Figure 1:
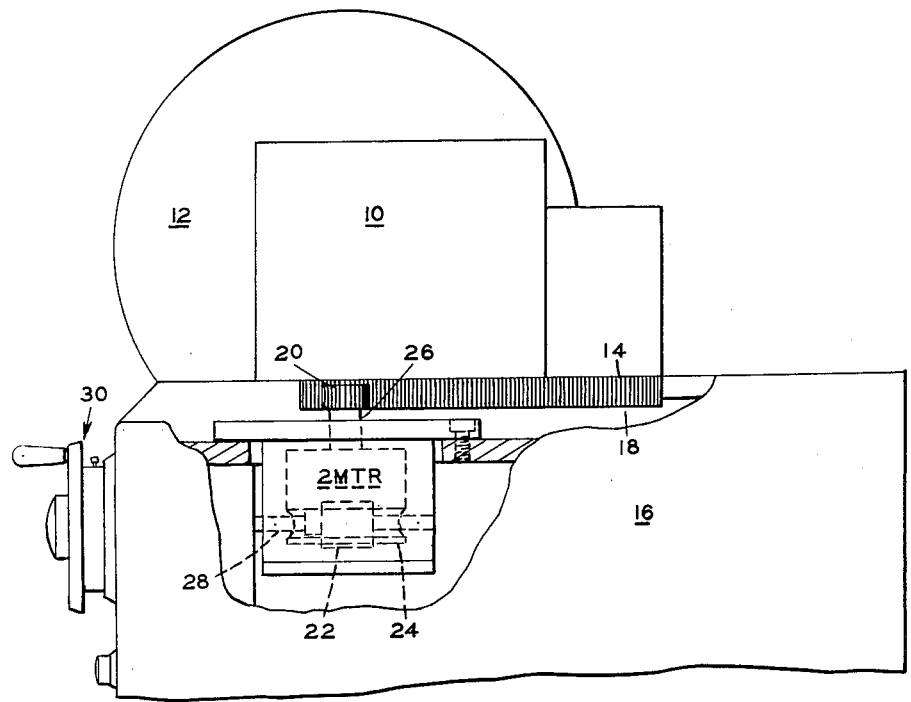
FIG. 1 is a side view of a simplified grinding machine.

In FIG. 1, a grinding machine is shown in simplified form having a wheel head 10 with a rotatable grinding wheel 12 mounted therein. The wheel head 10 is movable on ways 14 in the top of the base 16 toward and away from a work area at the left side of the machine as viewed in FIG. 1. A rack 18 is fixed to the wheel head 10 and is engaged by a pinion 20 which is rotated by a worm 22 and wheel 24 at the lower end of a shaft 26. The worm is fixed to a shaft 28 that extends from the worm wheel 24 to the handwheel mechanism 30 received in the side of the machine base 16.

Figures 2, 4:
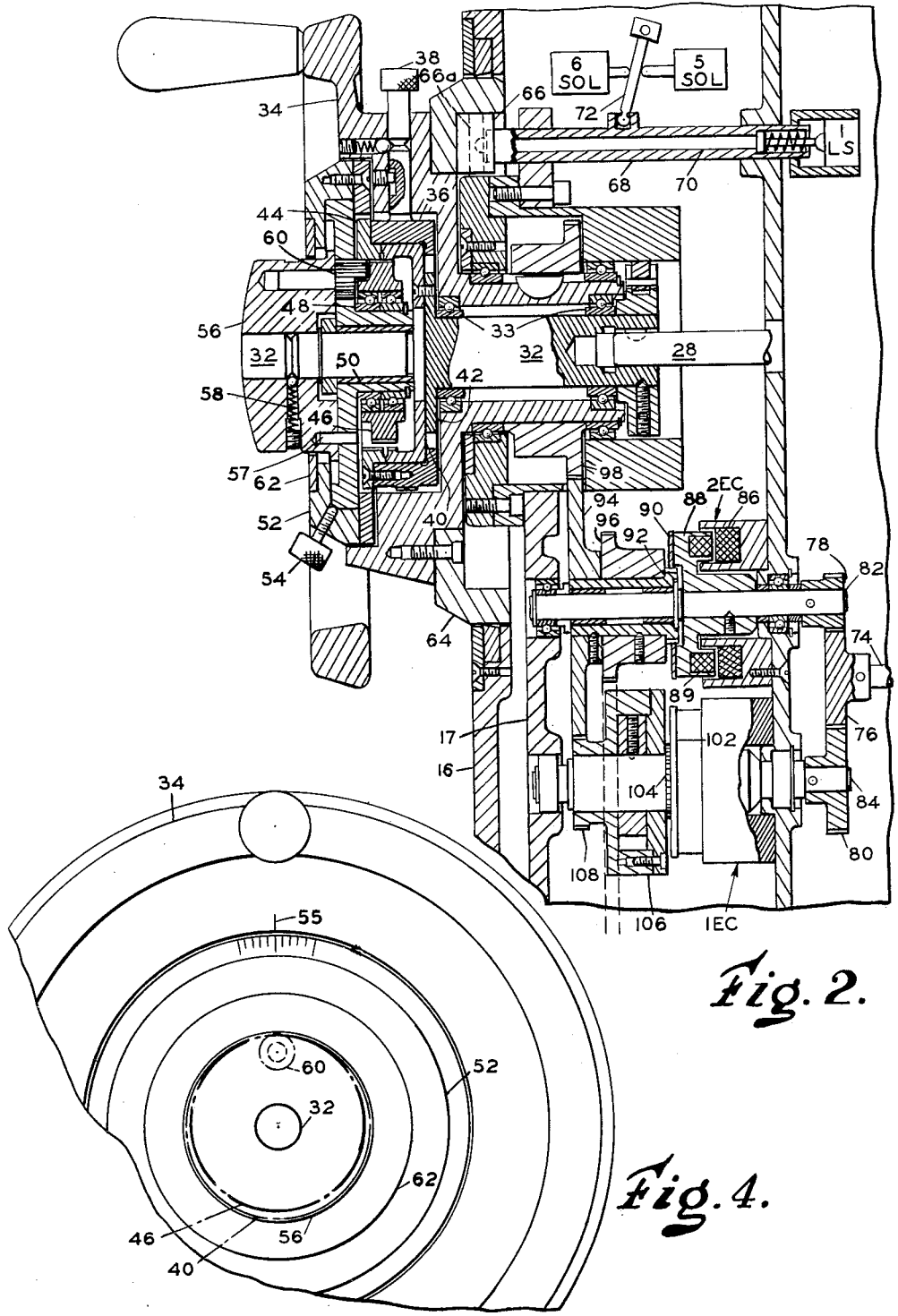
FIG. 2 is a section of the handwheel mechanism of the grinding machine.
FIG. 4 is a front view of the machine handwheel.

The handwheel mechanism 30 is shown in detail in FIG. 2. The shaft 28 on which the worm 22 is fixed is connected to the handwheel shaft 32 for rotation therewith. The handwheel shaft 32 is journaled in annular bearings 33 within the handwheel 34 itself and is rotatable relative thereto. The handwheel 34 (see also FIG. 4) is connectable for rotation with a gear member 36 (FIG. 2) by a detented pin 38 which has an end adapted to engage the teeth of the gear member 36. With the pin 38 disengaged from the gear 36, the handwheel 34 may be rotated without rotating the output shaft 28, the handwheel 34 being then disconnected relative to the succeeding members in the driving train. The gear member 36 is received over and rotatable relative to the outside diameter of an internal ring gear 40 which is fixed to a flange 42 integral with the handwheel shaft 32. An internal ring gear 44 is fixed to one end of the intermediate gear member 36 with its teeth adjacent those of the internal gear 40. These two internal gears 40, 44 have a difference in number of teeth, however. A gear 46 is engaged with the two ring gears 40, 44. The gear 46 is rotatably mounted on annular bearings 48 over an eccentric bushing 50 rotatably received over the handwheel shaft 32 (FIG. 4 also). The eccentric bushing 50 has a flange portion which is connectable to a dial 52 by a thumb screw 54. By releasing the screw 54 from the eccentric bushing 50, the dial 52 may be set relative to a zero index mark 55 (FIG. 4).

A knob 56 is received through the dial 52 and movable on the end of the handwheel shaft 32. The knob 56 is axially movable relative to the eccentric bushing 50 but is rotatable therewith, there being a pin 57 fixed in the bushing 50 and loosely received in the knob 56. A ball spring detent 58 tends to hold the knob in a position in which a pinion 60, fixed to the knob 56, is engaged with the internal gear 44. The knob 56 may be withdrawn to disengage the pinion 60 from the ring gear 44. When this is done the knob 56 may be rotated to rotate the eccentric bushing 50 which causes the point of engagement between the gear 46 and gears 40 and 44 to revolve. Gear 40 is relatively fixed due to the resistance to movement offered by the wheelhead 10 connected to the gear 40 by shafts 28 and 32. Since there is a difference in number of teeth between gears 40 and 44, the gear 44 is rotated at a reduced speed relative to the dial 52. In this manner small adjustments may be made in the position of the handwheel 34 in machine setup. The hub 50 has a retaining ring 62 received therein which prevents the knob 56 from being withdrawn completely from the handwheel shaft 32.

A collar 64 is fixed around the handwheel 34 in which a stop dog 66 is fixed. The collar 64 has calibration markings thereon to indicate movement of the wheelhead 10 as the handwheel 34 is rotated. The stop dog 66 is adapted to engage a positive stop 68 through which a spring loaded plunger 70 is received. The plunger 70 engages an inclined surface portion 66a of the stop dog 66 and operates a limit switch 1LS concurrent with engagement between the dog 66 and positive stop 68. The positive stop 68 is shown in the advanced position but may be retracted by operation of solenoid 6SOL which swings lever 72 to the right as viewed in FIG. 2. Solenoid 5SOL, when energized, holds lever 72 as shown to advance the positive stop 68 to render it effective by placing it in a position to engage the stop dog 66.

The drive to the handwheel mechanism 30 is furnished by a hydraulic motor 1MTR (FIG. 7) which rotates a drive shaft 74 (FIG. 2) on which a gear 76 is fixed. The gear 76 engages gears 78 and 80 fixed to the ends of shafts 82 and 84 respectively. The shaft 82 is shown journaled in a mounting bracket 17. A stationary field electric retraction feed clutch assembly 2EC is shown around the shaft 82 with a magnetic member 88 fixed on the shaft 82 for rotation therewith. The magnetic member 88 includes a secondary winding 89 in which a current is induced by the stationary winding 86 to magnetize the member 88. When the retraction clutch 2EC is energized, the magnetic member 88 holds a clutch disc or gear 90 firmly thereto. The disc gear 90 is internally splined and engaged with an externally splined gear 92 which is rotatably received on the shaft 82. A pair of gears 94, 96 are fixed to gear 92 for rotation therewith. Gear 94 is in mesh with a gear 98 received on the handwheel 34 and keyed for rotation therewith. Thus when the retraction clutch 2EC is energized, the motor 1MTR rotates the handwheel 34 through the retraction train of gears 76, 78, 90, 92, 94 and 98.

Shaft 84 has an electric infeed clutch assembly 1EC received therearound identical to the retraction clutch assembly 2EC and includes a clutch disc or gear 102 which is engaged with a gear 104 that drives through an overrunning clutch 106 to the gear 108 which is engaged with the gear 94 on the shaft 82. Thus, when the infeed clutch 1EC is energized, the motor 1MTR drives through the infeed train of gears 76, 80, 102, 104, 108, 94, and 98 to rotate the handwheel 34. The handwheel 34 is rotated in the opposite direction when the infeed clutch 1EC is energized relative to the direction of rotation when the retraction clutch 2EC is energized since the drive is through one more gear, the rotation of motor 1MTR being in the same direction in either case.

Figure 3:
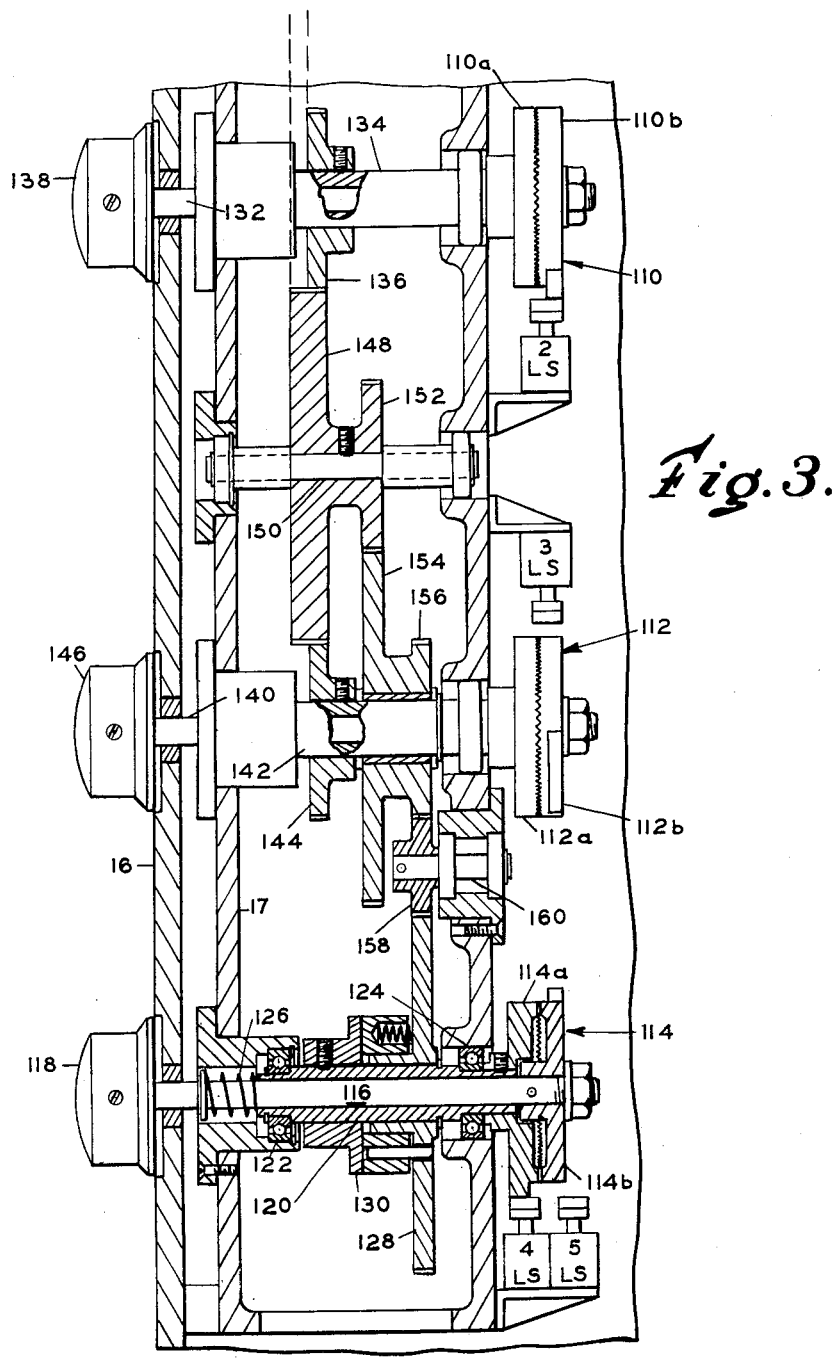
FIG. 3 is a roll-out view of a mechanism associated with the handwheel mechanism of FIG. 2.

A set of rotatable control cams are shown in FIG. 3. This set includes a normal feed cam 110, a fine feed cam 112, and an extended range cam 114. As shown, the extended range cam 114 is made up of two half sections 114a, 114b, each of which is adapted to engage one of a pair of limit switches 4LS, 5LS, respectively, as the cam 114 is rotated. One half 114b of the cam 114 is fixed on the end of a shaft 116 which extends through the front of the machine base 16 where an adjusting knob 118 is fixed thereon. The shaft 116 is received through a sleeve 120 and is rotatable therein. The sleeve 120 is journaled in bearings 122, 124 in the mounting bracket 17 for rotation. The other half 114a of the cam 114 is fixed to the sleeve 120. A spring 126 is received between the sleeve 120 and a flange on the shaft 116 in such a manner that the two halves of the cam 114 are urged together. The faces of the halves 114a, 114b are serrated so that when urged together they become relatively fixed together and rotate in unison. A gear 128 is rotatably received over the sleeve 120 and adjacent that gear is a friction clutch 130 which drives the sleeve 120 when the gear 128 is rotated. The sleeve then rotates with one half 114a of the cam 114 and drives the other half 114b and the shaft 116. Thus the two cam halves 114a, 114b, the shaft 116, the sleeve 120 and the gear 128 rotate in unison.

With the gear 128 stopped by an external force as when the handwheel mechanism is locked by energization of both clutches 1EC and 2EC, the knob 118 may be turned against the resistance of the friction clutch 130 to adjust the cams, particularly one half 114a relative to its associated limit switch 4LS. In order to adjust the other half 114b of the cam 114, the knob 118 is pushed in toward the base 16 against the force of the spring 126 to shift the shaft 116 and cam half 114b to the right as viewed in FIG. 3. This separates the two cam halves 114a, 114b and the knob 118 may then be turned to change the angular adjustment of the cam half 114b relative to its associated limit switch 5LS without rotating the other half 114a.

The normal feed cam 110 is composed of two halves 110a and 110b, each fixed for rotation with a shaft 132 and sleeve 134, respectively. The sleeve 134 is rotatable on the shaft 132 and is journaled for rotation in the base 16. A spring (not shown), received in the same manner as spring 126, is received between the shaft 132 and sleeve 134 to urge the two halves 110a, 110b together at serrated surfaces of contact to fix the two halves together and hence to relatively fix the shaft 132 and sleeve 134 for rotation together. A gear 136 is fixed to the sleeve 134 for rotation therewith and when a driving torque is applied to gear 136, the cam 110 is rotated. The cam half 110b may be adjusted relative to its associated limit switch 2LS by depression of a knob 138 fixed to the end of the shaft 132 against the bias of the spring received between the shaft 132 and sleeve 134 to separate the two cam halves 110a, 110b and subsequent rotation of the knob 138. The cam 110 has only one associated limit switch. Consequently, no friction clutch such as clutch 130 on sleeve 120 is necessary.

The fine feed cam 112 is also composed of two halves 112a, 112b having adjacent serrated faces fixed respectively on a shaft 140 and sleeve 142. The shaft 140 and sleeve 142 also have a spring (not shown) like the spring 126 to bias the two halves 112a, 112b together so that the shaft 140 and sleeve 142 rotate together when a gear 144 fixed to sleeve 142 is caused to rotate. An adjusting knob 146 is also provided on the shaft 140 to adjust the cam half 112b relative to its associated limit switch 3LS.

The three cams 110, 112, 114 are driven by a gear train when the handwheel 34 (FIG. 2) is rotated. The gear 96 which rotates with the gear 94 through which rotary drive is applied to the gear 98 on the handwheel 34 is in mesh with a gear 148 (FIG. 3) which is fixed to a shaft 150 journaled for rotation in the mounting bracket 17. The gear 148 is in mesh with both gears 136 and 144 and rotates therewith. Hence, when gear 96 is rotated, the normal feed cam 110 and the fine feed cam 112 are rotated. Another gear 152 is fixed adjacent the gear 148 on shaft 150 and rotates therewith. Gear 152 is in mesh with a gear 154 journaled for rotation relative to the sleeve 142 on shaft 140. A smaller gear 156 is fixed adjacent the gear 154 on shaft 140 and rotates therewith. The gear 156 is in mesh with an idler gear 158 fixed to a shaft 160 journaled for rotation in the rear of the mounting bracket 17. The idler gear 158 is in mesh with the gear 128 which is held for rotation with the sleeve 120 by the friction clutch 130. By selection of suitable gear ratios the normal feed cam 110 and fine feed cam 112 may be rotated in a 1 to 1 ratio, for example, relative to the handwheel 34. The extended range cam 114 is rotated at a much slower rate, for example, 1 to 10 relative to the handwheel 34.

Figure 5:
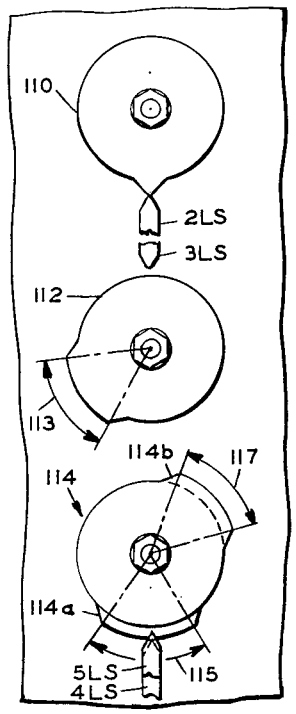
FIG. 5 is a partial view of the mechanism shown in FIG. 3 as viewed from the right in FIG. 3.

The control cams 110, 112, 114 are shown in FIG. 5 as viewed from the right side of FIG. 3. The cams 110, 112, 114 rotate together in the same direction, cam 114 rotating at a fraction of the speed at which cams 110 and 112 rotate. Cams 110 and 112 rotate at the same speed and this may conveniently be the same speed at which the handwheel 34 (FIG. 2) is rotated. The control circuit is set up such that during infeed, limit switches 3LS and 5LS must be operated concurrently to change the rate of speed of the feed motor 1MTR (FIG. 7) and to render the positive stop 68 (FIG. 2) effective. During retraction, the limit switches 2LS and 4LS must be operated concurrently to stop retraction of the wheelhead 10. Limit switches 4LS and 5LS are continuously operated by cam halves 114a and 114b, respectively, through angles of rotation of cam 114 represented by angles 115 and 117, respectively, which are approximately equal to each other and represent the amount cam 114 will rotate while the cams 110 and 112 make one full revolution. By adjustment of cam 114, the cams 110, 112 may be allowed to rotate several times before they effectively operate the limit switches LS2 and LS3. Since cam halves 114a and 114b will continuously operate limit switches 4LS and 5LS, respectively, while rotating through angles 115 and 117 (these angles being approximately equal and representative of a full revolution of cams 110 and 112), the cams 110 and 112 may effectively operate the limit switches 2LS and 3LS within a selected revolution. The halves of cam 114 are adjusted to operate limit switches 4LS and 5LS during the selected rotation of the cams 110 and 112. By proper adjustment of cam 112, the amount of fine feed obtainable during infeed is equivalent to rotation of cam 112 through the angle 113. For convenient adjustment of the cams 110, 112, 114 dial faces (not shown) are attached to the machine base 16 under the knobs 138, 140, 118. These dial faces are calibrated in the same units as the units of calibration of the handwheel mechanism 30.

Figure 7:
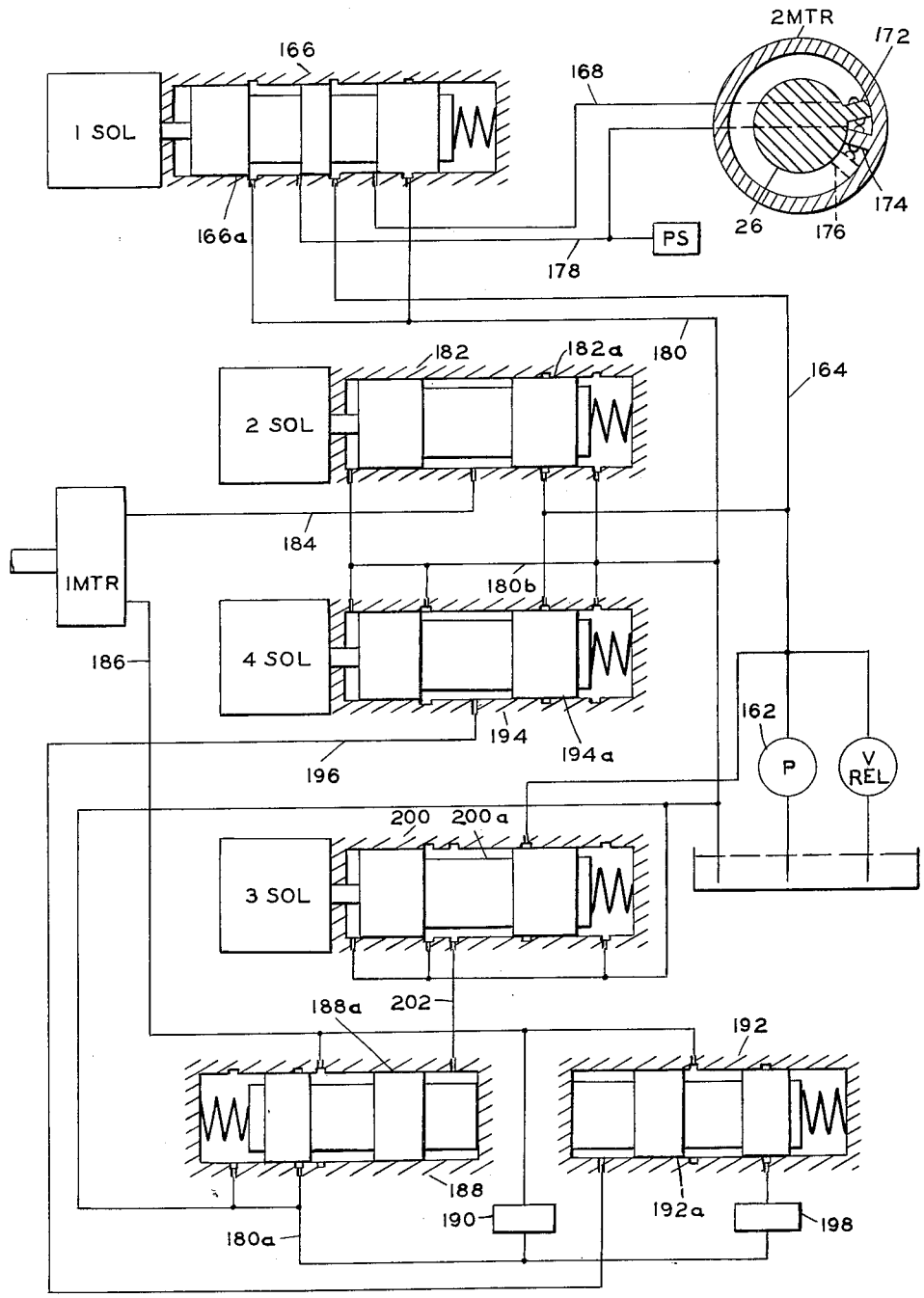
FIG. 7 is a hydraulic system diagram.

In FIG. 7, a hydraulic circuit is shown by which a machine equipped as described is operated. Fluid under pressure is provided by a pump 162 to the main pressure line 164. Pressure line 164 connects with the cycle start valve 166 operated by solenoid 1SOL. In the starting condition as shown with solenoid 1SOL deenergized, valve 166 connects pressure from line 164 to line 168 which connects to a paddle motor 2MTR. The pressure in line 168 holds the paddle portion 172 in the position shown against a wall 174 fixed in the motor 2MTR. The paddle portion is fixed to the shaft 26 (see FIG. 1) which is rotatable in the motor 2MTR through a swing which moves the paddle portion 172 from engagement with the wall 174, as shown, to engagement with the opposite side of the wall 174 as indicated by the paddle in position 176. At the start of the cycle, solenoid 1SOL is energized and the plunger 166a of valve 166 shifts to the right to connect the pressure line 164 to fluid line 178 which connects to the motor 2MTR between the paddle 172 and the wall 174. Line 168 is then connected to the return line 180 in valve 166. The pressure differential in the motor 2MTR swings the paddle portion 172 through an arc to the indicated position 176 thus rotating the shaft 26 an equal amount. The pinion 20 on shaft 26 (FIG. 1) is rotated and forces the rack 18 to advance toward the machine front (to the left as viewed in FIG. 1) in a rapid motion.

When the paddle portion 172 has moved to the position 176, a pressure rise is felt in the motor 2MTR and line 178 since the fluid flow is stopped and full pump pressure is transmmitted thereto. When this happens, pressure switch PS is operated and solenoid 2SOL is energized. When solenoid 2SOL is energized the plunger 182a of valve 182 is pushed to the right as viewed in FIG. 7 and pressure line 164 is connected to motor line 184 which connects to the feed motor 1MTR to supply fluid under pressure thereto. A second motor line 186 is connected from the motor 1MTR to a by pass valve 188, a fine feed rate valve 190, and a slow feed control valve 192. At this point in the machine cycle, valve 188 is in the position shown and line 186 is not connected to any other line therethrough. Solenoid 4SOL is energized at the same time that solenoid 2SOL is energized. Consequently, the plunger 194a of valve 194 is shifted to the right to connect pressure from line 164 to line 196. Line 196 is connected to the valve 192 and the pressure therein forces the plunger 192a to the right. With the plunger 192a in this condition, line 186 connects through the slow feed rate valve 198 to the return line 180a connected to return line 180. The resistance to flow of fluid is less in the slow feed rate valve 198 than in the fine feed rate valve 190. Consequently, most of the fluid from motor 1MTR is passed through the slow feed rate valve 198 to the return line. The motor 1MTR is caused to operate at a slow feed rate and shaft 74 (see FIG. 2) is rotated thereby. The rotary motion of shaft 74 is transmitted to the handwheel 34 through the train of gears 76, 80, 102, 104, 108, 94, and 98 since the infeed clutch 1EC is energized at this time in the cycle. When the handwheel 34 is rotated, the shaft 32 is rotated. Consequently, as the shaft 32 is rotated, shaft 28 and the worm 22 (FIG. 1) fixed thereon rotate to cause the worm wheel 24 to rotate. The worm wheel 24 is integral with the rapid advance motor 2MTR. At this time, the pressure within the motor 2MTR prevents movement of paddle 172 (FIG. 7) and shaft 26 relative to the motor wall 174. Then by rotating the worm wheel 24, drive is transmitted from the wall 174 to the paddle 172 and shaft 26 to rotate the pinion 20 and move the wheelhand 10 on the ways 14 at a slow feed rate.

After a preset amount of slow feed, the solenoid 4SOL is deenergized and the plunger 194a of valve 194 shifts back to the position shown. Fluid line 196 is now connected to the return line 180b and the plunger 192a of valve 192 is allowed to shift back to the position shown where the line 186 is blocked from the slow feed rate valve 198. Return fluid from the feed motor 1MTR is forced to go through the fine feed rate valve 190 and the speed of the feed motor 1MTR is reduced. After an amount of fine feed, the handwheel dog 66 (FIG. 2) has engaged the positive stop 68 and the wheelhead is stopped.

After a delay period during which the stop dog 66 is held against the stop by the driving force of the motor 1MTR, the infeed clutch 1EC is deenergized and the retraction clutch 2EC energized to reverse the direction of drive to the handwheel 34. At the same time, solenoid 3SOL is energized to push the plunger 200a of valve 200 to the right (FIG. 7). Fluid under pressure from line 164 is then connected to pressure, the plunger 188a of valve 188 shifts to the left (as viewed in FIG. 7) to connect the motor return line 186 to the return line 180a. The valve 188 presents little resistance to flow and the motor 1MTR runs at a rapid rate to retract the wheelhead through its reverse feed stroke.

While the motor 1MTR is retracting the wheelhead, the solenoid 1SOL is also deenergized and the plunger 166a of valve 166 shifts back to the position shown in FIG. 7. Fluid line 178 is connected to the return line 180 and line 168 is connected to pressure. The paddle 172 is forced to swing back to the position shown and a rapid retraction motion is added to the feed retraction produced by the rapid operation of the feed motor 1MTR which, in driving the worm gear 22 (FIG. 1) as described, adds a rotary component to the motor 2MTR which swings the wall 174 (FIG. 7) as the paddle 172 is swung toward the wall 174.

When the wheelhead is returned to its starting position, the solenoids 2SOL and 3SOL (FIG. 7) are deenergized. Valve 182 returns to the condition shown to block motor line 184 from pressure line 164. The feed motor 1MTR is stopped. The plunger 200a of valve 200 shifts back to the position shown and motor return line 186 is blocked from the return line 180a. The hydraulic circuit is returned to its starting condition.

An electrical control circuit is shown in FIG. 6 by which the machine electrical and electro-hydraulic units are caused to produce a preselected feed cycle as determined by the adjustment of the control cams 110, 112, 114 (FIG. 3 in which horizontal conducting paths are indicated by numbers prefixed by the letter L along the left side of FIG. 6 and will be given in parentheses to indicate location).

At the start of a cycle, start switch SW1 (L8) is closed momentarily to cause relay 1CR (L8) to energize momentarily. When relay 1CR is energized its contacts in the circuit of relay 2CR (L9) close. At the start of a cycle, the wheelhead is in the retracted position and the normal feed cam 110 (FIG. 5) engages the limit switch 2LS, as shown, to operate it and close the contacts thereof in the circuit of relay 6CR (L15, FIG. 6). Cam half 114a of the extended range cam 114 (FIG. 5) is adjusted such that the limit switch 4LS is contacted thereby and its contacts in the circuit of relay 6CR (L15, FIG. 6) are also closed. The relay 6CR (L15) is then energized at the start of the cycle and its contacts in the circuit of relay 2CR are closed. Consequently, while relay 1CR (L8) is energized, relay 2CR (L9) latches through the normally closed contacts of timer 1TR and the latch contacts of relay 2CR (L10). With relay 2CR (L9) energized, the rapid advance solenoid 1SOL (L2) is energized through the contacts of relay 2CR in the solenoid 1SOL circuit. With solenoid 1SOL (L2) energized, pressurized fluid swings the paddle 172 (FIG. 7) of the rapid advance motor 2MTR to produce a rapid approach stroke of the wheelhead 10 (FIG. 1).

At the end of the rapid approach stroke, the pressure switch PS is operated and its contacts in the circuit of relay 3CR (L11, FIG. 6) are closed. Relay 3CR (L11) then energizes through the contacts of pressure switch PS (L11) and contacts of relays 2CR (energized now) and 7CR (L12, normally closed contacts). At this same time, relay 5CR (L14) is energized through the contacts of relays 2CR (now energized) and 7CR (normally closed contacts). Solenoids 2SOL and 4SOL (L3, L5, respectively) are now energized through contacts of relays 3CR and 5CR, respectively, in their circuits. Thus fluid under pressure is connected through valve 182 (FIG. 7) to the hydraulic feed motor 1MTR which runs at a slow feed rate to rotate the handwheel 34 and cams 110, 112 and 114 since the return fluid passes through the valve 192 and the slow feed rate valve 198. To allow the handwheel 34 to rotate when relay 3CR is energized, relay 9CR (L23) is deenergized by opening the contacts of relay 3CR in the circuit of relay 9CR. Relay 9CR normally causes both clutches 1EC (L20) and 2EC (L22) to be energized at the start of a cycle and causes the handwheel 34 (FIG. 2) to be locked to prevent rotation thereof. When relays 2CR (L9) and 3CR (L11) are both energized and relay 9CR is deenergized, the infeed clutch 1EC (L20) only is energized and handwheel 34 rotates toward engagement with the positive stop 68.

The wheelhead 10 (FIG. 1) is moved by the motor 1MTR while the handwheel 34 (FIG. 2) is rotated. The control cams 110, 112, 114 are rotated clockwise, as viewed in FIG. 5, at this time. After a slow feed movement corresponding to the adjustment of the fine feed cam 112, that cam operates limit switch 3LS and holds it operated until the fine feed cam 112 is rotated through an angle 113 (FIG. 5) corresponding to the width of the limit switch engaging portion of that cam. If the extended range cam 114 (FIG. 3) is adjusted to operate the limit switch 5LS at the same time, then the relay 7CR (L16, FIG. 6) is energized through contacts of limit switches 3LS and 5LS in that circuit. With relay 7CR energized, relay 5CR (L14) is deenergized. As relay 5CR (L14) is deenergized, so also is solenoid 4SOL (L5). Consequently the valve 194 shifts to the deenergized state shown in FIG. 7 and valve 192 is shifted back to block fluid from motor 1MTR and fluid from motor 1MTR is then passed through the fine feed rate valve 190 and the wheelhead 10 is moved at a fine feed rate.

Should the cam 114 (FIG. 5) be adjusted, as shown, to allow more than one revolution of the handwheel, the first contact between the cam 112 and limit switch 3LS would be ineffective since limit switch 5LS must also be operated by cam 114 at the same time to render the cam 112 effective, the contacts of limit switches 3LS and 5LS (L16, FIG. 6) being in series. The cam 114 is shaped to operate the limit switch 5LS continuously while the cam 114 rotates through the angle 117 (FIG. 5) which is equal to approximately one rotation of the cam 112. Thus the adjustment of the cam 114 must be such that the limit switch 5LS (FIG. 3) will be operated during the last rotation of the handwheel 34 during which a desired amount of feed movement of the wheelhead 10 (FIG. 1) corresponding to more than one full rotation of the handwheel 34 is completed.

It is apparent that the positive stop 68 (FIG. 2) must be retracted from the position in which it is adapted to be engaged by the stop dog 66 during rotation of the handwheel 34 in a direction corresponding to feed movement of the wheelhead 10 (FIG. 1) toward the work area (to the left as viewed in FIG. 1). Therefore, the positive stop 68 (FIG. 2) is held in the retracted position until the limit switch 5LS is operated during the last revolution of the handwheel 34 producing the predetermined total feed movement of the wheelhead 10. Until limit switch 5LS is operated, the solenoid 6SOL is energized through normally closed contacts of the limit switch 5LS (FIG. 6, L7) to hold the lever 72 in its "out" position to retract the positive stop 68 and allow the handwheel 34 to make more than one revolution in producing a predetermined amount of feed movement corresponding to more than one complete revolution of the handwheel. When limit switch 5LS is operated during the last revolution of the handwheel 34 during infeed movement of the wheelhead 10, the solenoid 5SOL (FIG. 2 and FIG. 6, L6) is energized through the normally opened contacts of limit switch 5LS which are now closed and the lever 72 is pushed forward to carry the positive stop 68 to its "in" or effective position.

At the termination of the predetermined amount of feed movement, the stop dog 66 engages the positive stop 68 and stops rotation of the handwheel 34 and movement of the wheelhead 10. The stop dog 66 also shifts the spring loaded plunger 70 inside the positive stop 68 to cause the limit switch 1LS to be operated. When limit switch 1LS is operated, the relay 8CR (FIG. 6, L17) is energized through the normally open contacts of that limit switch. When relay 8CR is energized, the sparkout timer 1TR (L18) is set off. At the end of a preset sparkout period, the timer opened, instantaneous closing contacts of the timer 1TR (L10) are opened to cause the relay 2CR (L9) to be deenergized. The rapid advance solenoid 1SOL (L2) is then deenergized and the plunger of the valve 166 (FIG. 7) shifts back to the position shown and fluid under pressure is connected from line 164 to line 168 while line 178 is connected to the return line 180. The paddle 172 is then caused to swing back to the position shown and the wheelhead 10 (FIG. 1) is moved through a rapid retraction stroke.

At the same time that the relay 2CR is deenergized, the relay 4CR (L13) is energized through the normally closed contacts of the relay 2CR and contacts of relay 3CR (relay 3CR, L11, remaining energized through a latch circuit including contacts of relays 2CR, normally closed, 3CR, and 6CR). Solenoid 3SOL (L4) is then energized. When solenoid 3SOL is energized, the plunger 200a of valve 200 (FIG. 7) shifts to the right and connects pressure to cause the plunger 188a of valve 188 to connect the motor return line 186 to the return line 180a. This effects a rapid operation of the motor 1MTR.

Also at the same time that relay 2CR is deenergized, the clutch EC1 (L20, FIG. 6) is deenergized and clutch EC2 (L22) is energized through contacts of relays 2CR (normally closed) and 3CR. Thus, the handwheel 34 (FIG. 2) is connected to the motor 1MTR for rotation away from the positive stop 68 and cams 110, 112, 114 (FIG. 5) are rotated counterclockwise. The rotation of the handwheel 34 and cams 110, 112, 114 is at a fast feed rate since the return fluid bypasses both rate valves 190 and 198 (FIG. 7). At the completion of rotation of the handwheel 34 to the starting position, the cam 110 (FIG. 3) operates limit switch 2LS as shown in FIG. 5. Limit switch 4LS must also be operated at the same time by cam 114, since normally open contacts of both limit switches 2LS and 4LS are in series in the circuit of relay 6CR (FIG. 6, L15) which, when energized at the end of a feed cycle, causes relay 3CR (L11) to be deenergized and the feed motor 1MTR to be stopped. Solenoid 2SOL (L3) is deenergized when relay 3CR is deenergized and the plunger 182a (FIG. 7) of the feed valve 182 is shifted back to the position shown to block pressure line 164 from the motor line 184. In returning the wheelhead 10 (FIG. 1) to its starting position, the handwheel 34 (FIG. 2) must be rotated through an amount equal to the rotation thereof during the infeed portion of the cycle. Therefore, the cam 114 (FIG. 3) is adjusted to operate the limit switch 4LS during the last revolution of the handwheel 34 during retraction before the wheelhead 10 is in its starting position. Thus, the cam 114 is adjusted to allow an equal number of full revolutions of the handwheel 34 before its respective limit switches 4LS, 5LS are operated when the handwheel 34 is moved to and from the positive stop 68 during automatic cycle operation.

When relay 3CR (L11, FIG. 6) is deenergized, relay 4CR (L13) is deenergized. Then solenoid 3SOL (L4) is deenergized and the bypass valves 200, 182 (FIG. 7) are returned to the condition shown. Relay 9CR (L23, FIG. 6) is energized. When relay 9CR is energized, the clutches 1EC (L20), 2EC (L22) are both energized and the handweel 34 (FIG. 2) is locked and prevented from rotating in either direction. When the wheelhead was retracted, the energizing circuit of relay 7CR (L16, FIG. 6) through the normally open contacts of switches 3LS and 5LS was opened and that relay deenergized. The control circuit is then in its starting condition with relays 6CR (L15) and 9CR (L23) and clutches 1EC (L20) and 2EC (L22) energized.

What is claimed is:

1. In a machine tool having a slide movable on ways, a slide movement control mechanism comprising in combination, a rotatable control member connected for movement of said slide in accordance with the direction and amount of rotation of said control member, said control member having a stop dog fixed thereto; a feed motor; means to connect said feed motor to said control member for rotation in one and the other directions; a positive stop adapted to engage said dog and stop rotation of said control member in said one direction; and presettable means, including a plurality of trip members and cams relatively rotatable in response to movement of the slide by said control member and relatively adjustable, to control said means to connect the feed motor and the control member and effect a predetermined rotary movement of said control member in said one direction to move said dog to said positive stop and in said other direction to move said dog away from said positive stop to a predetermined angular position to produce a cycle of movement of said slide.

2. In a machine tool having a slide movable on ways, a slide movement control mechanism comprising in combination, a rotatable control member connected to said slide for movement of the slide in accordance with the direction and amount of rotation of said control member, said control member having a stop dog fixed thereto; a feed motor, means selectively operable to change the rate of operation of said feed motor; means to connect said feed motor to said control member for rotation thereof in one and the other directions; a positive stop adapted to engage said dog and terminate rotation of said control member in said one direction when said dog is at a fixed angular position; presettable means, including a first trip member and a first rotatable cam adjustable relative to said first trip member, to operate said means to change the rate of operation of said motor when said dog is at a predetermined angular distance from said positive stop during movement of said control member in said one direction; and presettable means, including a second trip member and a second rotatable cam adjustable relative to said second trip member, to terminate rotation of said control member in said other direction when said dog is at a predetermined angular position.

3. In a machine tool having a slide movable towards and away from a selected fixed position defining one extreme limit of slide movement, mechanism to define the other extreme limit of slide movement comprising, a pair of cams; a trip member adjacent each of said cams for operation thereby, each cam and trip member adjacent thereto relatively rotatable in response to movement of the slide, the rate of relative rotation of one cam and trip member being at a rate different from the rate of relative rotation of the other cam and trip member and each cam and trip member adjacent thereto relatively adjustable for operation of the trip member after a predetermined rotation of the cam; and means responsive to a predetermined condition of operation of both trip members to terminate movement of the slide at the other extreme limit.

4. In a machine tool having a slide movable towards and away from a selected fixed position defining one extreme limit of slide movement, mechanism to define the other extreme limit of slide movement comprising, a pair of cams rotatable at different speeds in response to movement of the slide, a trip member adjacent each of said cams for operation thereby, each cam and the trip member adjacent thereto relatively adjustable for operation of the trip member after a predetermined rotation of the cam, and means responsive to the operation of both trip members to terminate movement of the slide at the other extreme limit.

5. In a machine tool having a slide movable on ways, a slide movement control mechanism comprising in combination, a rotatable control member connected to said slide for movement of the slide in accordance with the direction of rotation of said control member, said control member having a stop dog fixed thereto; a feed motor; means selectively operable to change the rate of operation of said motor; means to connect said motor to said control member for rotation thereof in one and the other directions; a positive step adapted to engage said dog and terminate rotation of said control member in said one direction when said dog is in a fixed angular position; first presettable means, including a first trip member and a first rotatable cam adjustable relative to said first trip member, to operate said means to change the rate of operation of said motor when said dog is at a predetermined angular distance from said positive stop during movement of said control member in said one direction; second presettable means, including a second trip member and a second rotatable cam adjustable relative to said second trip member, to terminate rotation of said control member in said other direction when said dog is at a predetermined angular position; and third presettable means, including a pair of trip members and a third rotatable cam composed of two portions, each portion independently adjustable relative to one of said pair of trip members, said third presettable means operable to render said positive stop and first presettable means ineffective through a predetermined number of revolutions of said control member in said one direction and to render said second presettable means ineffective through said predetermined number of revolutions of said control member in said other direction.

6. In a precision grinding machine having a wheelhead movable on ways, a control mechanism comprising in combination, a rotatable handwheel connected to said wheelhead for movement thereof in accordance with rotation of said handwheel, said handwheel having a stop dog fixed thereto; a feed motor; means selectively operable to change the rate of operation of said feed motor; means to connect said feed motor to said handwheel for rotation thereof in one direction; a positive stop adapted to engage said dog and terminate rotation of said handwheel in said one direction when said dog is at a fixed angular position; a first rotatable cam; a first trip member adapted to engage said first cam when said first cam is rotated through a range of angular positions relative to said first trip member; means responsive to engagement of said first trip member and cam during rotation of said handwheel in said one direction to operate said means to change rate of operation of said motor; means to connect said first cam for rotation when said handwheel rotates; means to adjust the relative angular position of said first cam and trip member; means to connect said motor to said handwheel for rotation thereof in the other direction; a second rotatable cam; a second trip member adapted to engage said second cam when said second cam is in a predetermined angular position relative to said second trip member; means responsive to engagement of said second cam and trip member during rotation of said handwheel in said other direction to terminate rotation of said handwheel in said other direction; means to connect said second cam for rotation when said handwheel rotates; and means to adjust the relative angular position of said second trip member and said second cam.

7. In a precision grinding machine having a wheelhead movable on ways, a feed cycle control mechanism comprising in combination, a rotatable handwheel connected to said wheelhead for movement thereof in accordance with rotation of said handwheel, said handwheel having a stop dog fixed thereto; a feed motor; means selectively operable to change the rate of operation of said feed motor; means to connect said feed motor to said handwheel for rotation thereof in one direction; a positive stop adapted to engage said dog and terminate rotation of said handwheel in said one direction when said dog is at a fixed angular position; a first rotatable cam; a first trip member adapted to engage said first cam when said first cam is rotated through a range of angular positions relative to said first trip member; means responsive to engagement of said first cam and trip member during rotation of said handwheel in said one direction to operate said means to change rate of operation of said motor; means to connect said handwheel to said first cam for rotation thereof when said handwheel rotates; means to adjust the relative angular position of said first cam and said first trip member; means to connect said motor to said handwheel for rotation in the other direction; a second rotatable cam; a second trip member adapted to engage said second cam when said second cam is in a predetermined angular position relative to said second trip member; means responsive to engagement of said second cam and trip member during rotation of said handwheel in said other direction to terminate rotation of said handwheel in said other direction; means to connect said handwheel to said second cam for rotation thereof when said handwheel rotates; means to adjust said second cam relative to said second trip member; a third rotatable cam; having two independently adjustable portions; a third trip member adapted to engage one portion of said third cam when said third cam is rotated through a range of angular positions relative to said third trip member; means responsive to the condition of disengagement and engagement of said one portion of the third cam and third trip member to render said positive stop and said means responsive to engagement of said first cam and trip member ineffective during a predetermined number of revolutions of said handwheel in said one direction; a fourth trip member adapted to engage the other portion of said third cam when said third cam is rotated through a range of angular positions relative to said fourth trip member; means responsive to the condition of disengagement and engagement said other portion of the third cam and fourth trip member to render said means responsive to engagement of said second cam and trip member ineffective during said predetermined number of revolutions of said handwheel in said other direction; means to adjust the portions of said third cam relative to said third and fourth trip members; and means to connect said handwheel to said third cam for rotation thereof at a rate less than the rate of rotation of said first and second cams when said handwheel is rotated.

8. In a precision grinding machine having a wheelhead movable on ways, a feed cycle control mechanism comprising in combination, a rotatable handwheel connected to said wheelhead for movement thereof in accordance with rotation of said handwheel, said handwheel having a stop dog fixed thereto; a feed motor; means selectively operable to change the rate of operation of said motor; means to connect said handwheel for rotation in one direction; means to connect said handwheel for rotation in the other direction; a positive stop adapted to engage said dog and terminate rotation of said handwheel in said one direction when said dog is at a fixed angular position; a set of rotatable cams including a first cam, a second cam, and a third cam having two portions; means to connect said cams to said handwheel for rotation when said handwheel rotates, said third cam rotated at a rate less than the rate of said first and second cams; a set of trip members including a first trip member adapted to engage said first cam when said first cam is rotated through a range of positions relative to said first trip member, a second trip member adapted to engage said second cam when said second cam is in a predetermined angular position relative to said second trip member, and third and fourth trip members each adapted to engage a portion of said third cam when said third cam is rotated through respective ranges of angular positions relative to said third and fourth trip members; means to adjust said cams one at a time to change the angular positions thereof relative to the respective trip members; means responsive to engagement of said first cam and trip member during rotation of said handwheel in said one direction to operate said means to change said rate of operation of said motor; means responsive to engagement of said second cam and trip member during rotation of said handwheel in said other direction to terminate rotation of said handwheel; means responsive to the condition of disengagement and engagement of one portion of said third cam and third trip member during rotation of said handwheel in said one direction to render ineffective said positive stop and means to change said rate of operation of said motor; means responsive to the condition of disengagement and engagement of the other portion of said third cam and said fourth trip member during rotation of said handwheel in said other direction to render ineffective said means responsive to engagement of said second cam and trip member; and means to disengage said handwheel from said wheelhead for adjustment of the angular position of said handwheel relative to the position of the wheelhead on said ways.

9. In a precision grinding machine having a wheelhead movable on ways, a feed cycle control mechanism comprising in combination, a rotatable handwheel connected to said wheelhead for movement thereof in accordance with rotation of said handwheel, said handwheel having a stop dog fixed thereto; a unidirectional feed motor, rate control means operable to energize said motor for operation in three speeds including rapid feed, slow feed, and fine feed; a first clutch operable when energized to connect said handwheel to said motor for rotation in one direction; a second clutch operable when energized to connect said handwheel to said motor for rotation thereof in the other direction; a positive stop adapted to engage said dog and terminate rotation of said handwheel in said one direction when said dog is at a fixed angular position; a set of rotatable cams including a first cam, a second cam, and a third cam having two portions; a gear train operable to connect said cams to said handwheel for rotation when said handwheel rotates, said third cam rotated thereby at a rate less than the rate of said first and second cams; a set of limit switches including a first switch adapted to be operated by said first cam when said first cam is rotated through a range of angular positions relative to said first switch, a second switch adapted to be operated by said second cam when said second cam is in a predetermined angular position relative to said second switch, a third switch adapted to be operated by one portion of said third cam when said third cam is rotated through a range of angular positions relative to said third switch, a fourth switch adapted to be operated by the other portion of said third cam when said third cam is rotated through a range of positions relative to said fourth switch, and a fifth switch adapted to be operated by said dog when said dog is in said fixed angular position thereof; means to adjust the angular positions of said cams one at a time relative to the respective limit switches operated thereby and including means to relatively adjust the two portions of the third cam; means responsive to operation of said first switch during rotation of said handwheel in said one direction to operate said rate control means for energizing said motor at said fine feed rate; means responsive to operation of said second switch during rotation of said handwheel in said other direction to deenergize said second clutch and said motor; means responsive to non-operation of said third switch during rotation of said handwheel in said one direction to render ineffective said positive stop and said means responsive to operation of said first switch; means responsive to non-operation of said fourth switch during rotation of said handwheel in said other direction to render ineffective said means responsive to operation of said second switch; means responsive to operation of said fifth switch during rotation of said handwheel in said one direction to effect deenergization, after a predetermined delay, of said first clutch and energization of said second clutch and operation of said rate control means to energize said motor for operation at said rapid rate; means to energize said first clutch and operate said rate control means for energizing said motor to operate at said slow rate when said second switch is operated by said second cam; and means to disengage said handwheel from said wheelhead for adjustment of the angular position of said handwheel relative to the position of said wheelhead on said ways.

References Cited in the file of this patent
FOREIGN PATENTS
299,463     Switzerland _____ Aug. 16, 1954